United States Patent
Wang et al.

(10) Patent No.: US 10,674,494 B2
(45) Date of Patent: Jun. 2, 2020

(54) METHODS FOR TRANSMITTING AND RECEIVING PHYSICAL DOWNLINK CHANNEL, BASE STATION AND USER EQUIPMENT

(71) Applicant: SHARP KABUSHIKI KAISHA, Osaka-shi, Osaka (JP)

(72) Inventors: Feng Wang, Shanghai (CN); Renmao Liu, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 14/910,214

(22) PCT Filed: Aug. 6, 2014

(86) PCT No.: PCT/CN2014/083808
§ 371 (c)(1),
(2) Date: Feb. 4, 2016

(87) PCT Pub. No.: WO2015/018342
PCT Pub. Date: Feb. 12, 2015

(65) Prior Publication Data
US 2016/0192333 A1 Jun. 30, 2016

(30) Foreign Application Priority Data

Aug. 6, 2013 (CN) .......................... 2013 1 0339122

(51) Int. Cl.
*H04W 72/04* (2009.01)
*H04W 4/00* (2018.01)
(Continued)

(52) U.S. Cl.
CPC ......... *H04W 72/042* (2013.01); *H04L 1/0026* (2013.01); *H04L 5/0053* (2013.01);
(Continued)

(58) Field of Classification Search
CPC ..... H04W 72/042; H04W 4/005; H04W 4/70; H04L 5/0053; H04L 5/0094;
(Continued)

(56) References Cited

U.S. PATENT DOCUMENTS 9,635,644 B2 * 4/2017 Chen ..................... H04W 72/04
2012/0320778 A1 12/2012 Lv et al.
(Continued)

FOREIGN PATENT DOCUMENTS

CN 102158874 A 8/2011

OTHER PUBLICATIONS

U.S. Appl. No. 61/858,633.*
(Continued)

*Primary Examiner* — Faisal Choudhury
(74) *Attorney, Agent, or Firm* — Birch, Stewart, Kolasch & Birch, LLP

(57) ABSTRACT

The present disclosure provides a method performed by a base station. The method comprises: obtaining a coverage enhancement level of a User Equipment (UE); determining Physical Downlink Control Channel (PDCCH) configuration information for the UE based on the coverage enhancement level of the UE; determining Physical Downlink Shared Channel (PDSCH) configuration information for the UE based on the coverage enhancement level of the UE; and modifying a Downlink Control Information (DCI) configuration parameter to add the PDCCH configuration information and the PDSCH configuration information. Also provided are a method performed by a UE, a base station and a UE. With the present disclosure, it is possible to increase resource utilization for LTE to support MTC UEs, improve frequency spectrum/energy efficiency, and reduce time/frequency resource conflicts between cells.

8 Claims, 7 Drawing Sheets

(51) Int. Cl.
*H04W 4/70* (2018.01)
*H04L 5/00* (2006.01)
*H04L 1/00* (2006.01)

(52) U.S. Cl.
CPC .............. *H04L 5/0094* (2013.01); *H04W 4/70* (2018.02); *Y02D 70/1262* (2018.01); *Y02D 70/1264* (2018.01); *Y02D 70/21* (2018.01)

(58) Field of Classification Search
CPC .............. H04L 1/0026; Y02D 70/1262; Y02D 70/1264; Y02D 70/21
USPC .......................................................... 370/329
See application file for complete search history.

(56) References Cited

U.S. PATENT DOCUMENTS

| | | | | | |
|---|---|---|---|---|---|
| 2014/0098761 | A1* | 4/2014 | Lee | ..................... | H04W 74/006 370/329 |
| 2015/0245323 | A1* | 8/2015 | You | ..................... | H04W 72/042 370/329 |
| 2016/0057784 | A1* | 2/2016 | You | ..................... | H04W 88/04 370/329 |
| 2016/0081077 | A1* | 3/2016 | Li | ......................... | H04L 5/0055 370/280 |
| 2016/0143017 | A1* | 5/2016 | Yang | ..................... | H04L 1/1812 370/329 |
| 2016/0150539 | A1* | 5/2016 | Xu | ..................... | H04W 72/0406 370/329 |
| 2016/0165640 | A1* | 6/2016 | Yang | ..................... | H04W 74/08 370/336 |
| 2016/0182208 | A1* | 6/2016 | Yi | ......................... | H04L 1/0026 370/329 |
| 2016/0183112 | A1* | 6/2016 | Yang | ..................... | H04B 17/00 370/252 |
| 2016/0338020 | A1* | 11/2016 | Gao | ........................ | H04W 4/70 |
| 2016/0353420 | A1* | 12/2016 | You | ....................... | H04L 5/0053 |
| 2017/0180098 | A1* | 6/2017 | You | ....................... | H04L 5/0055 |

OTHER PUBLICATIONS

U.S. Appl. No. 61/807,945.*
U.S. Appl. No. 61/810,678.*
U.S. Appl. No. 61/858,633, filed Jul. 26, 2013.*
U.S. Appl. No. 61/752,444, filed Jan. 14, 2013.*
LG Electronics, "Further consideration points for provision of MTC UEs", 3GPP TSG RAN WG1 #73, R1-132234, May 20-24, 2013, Fukuoka, Japan, Section 2.1-2.2.
Sierra Wireless, "Text proposal for MTC PDCCH coverage improvement through blind HARQ combining", 3GPP TSG RAN WG1 #72, R1-130065, Malta, Jan. 28, 2013.

* cited by examiner

METHODS FOR TRANSMITTING AND RECEIVING PHYSICAL DOWNLINK CHANNEL, BASE STATION AND USER EQUIPMENT

TECHNICAL FIELD

The present disclosure relates to wireless communication technology, and more particularly, to a method for transmitting/receiving physical downlink channel of a serving cell, a base station and a user equipment.

BACKGROUND

The Long Term Evolution (LTE) system deployed by the $3^{rd}$ Generation Partner Project (3GPP) is intended to provide increasingly diversified mobile communication services in the future. Wireless cellular communications have become an essential part of people's lives and work. In the first release (Release 8) of the 3GPP LTE, Orthogonal Frequency Division Multiple Access (OFDMA) and Multiple Input Multiple Output (MIMO) techniques have been introduced. After evaluation and test by International Telecommunication Union (ITU), the 3GPP Release 10 has been established as the $4^{th}$ generation global mobile communication standard, known as LTE-Advanced. In the LTE-Advanced standard, Carrier Aggregation (CA) and relay techniques have been introduced to improve uplink (UL)/downlink (DL) MIMO technique while supporting heterogeneous network (HetNet) deployment.

In order to meet the market demand on home device communications and the deployment of a huge-scale Internet of Things (IoT) in the future, the 3GPP has decided to introduce a low-cost Machine Type Communication (MTC) technique in the LTE and its further evolution, to transfer MTC services from the current GSM network to the LTE network and define a new type of User Equipment (UE), referred to as Low-cost MTC UE. Such UE can support MTC services in all duplex modes in the current LTE network and has: 1) one single receiving antenna; 2) a maximum Transport Block Size (TBS) of 1000 bits in UL/DL; and 3) a reduced baseband bandwidth of DL data channel of 1.4 MHz, a bandwidth of DL control channel identical to the system bandwidth of the network layer, and the same UL channel bandwidth and DL Radio Frequency (RF) part as UEs in the current LTE network.

The MTC is a data communication service without human involvement. A large-scale deployment of MTC UEs can be applied to various fields such as security, tracking, payment, measurement, consumer electronics, and in particular to applications such as video surveillance, supply chain tracking, intelligent metering and remote monitoring. The MTC requires low power consumption and supports low data transmission rate and low mobility. Currently, the LTE system is mainly designed for Human-to-Human (H2H) communication services. Hence, in order to achieve the scale benefit and application prospect of the MTC services, it is important for the LTE network to support the low-cost MTC devices to operate at low cost.

Some MTC devices are mounted in basements of residential buildings or locations protected by insulating films, metal windows or thick walls of traditional buildings. These devices will suffer significantly higher penetration loss in air interface than conventional device terminals, such as mobile phones and tablets, in the LTE network. The 3GGP has started researches on solution designs and performance evaluations for the LTE network to provide the MTC devices with a 20 dB of additional coverage enhancement. It is to be noted that an MTC device located in an area with poor network coverage has a very low data transmission rate, a very loose delay requirement and a limited mobility. For these MTC characteristics, some signaling and/or channels of the LTE network can be further optimized to support the MTC. The 3GPP requires providing the newly defined low cost UEs and other UEs running MTC services (e.g., with very loose delay requirements) with a certain level of LTE network coverage enhancement. In particular, a 15 dB of network coverage enhancement is provided in the LTE Frequency Division Duplex (FDD) network. Additionally, not all UEs running MTC services need the same network coverage enhancement.

For the new low-cost MTC devices, in the DL, the data channel is 1.4 MHz (i.e., 6 RBs) and the control channel can still access the entire DL system bandwidth in the baseband part, while the RF link part remains the same, i.e., the entire system bandwidth can be accessed. In the UL, the baseband part and the RF part both remain the same. In addition, the low-cost MTC UE has one single receiving antenna and its maximum UL transport block and DL transport block are each 1000 bits. Since the baseband data channel in the DL is 6 RBs, if the data channel is fixed into the 6 RBs near the DC carrier frequency, the PDSCH frequency selective scheduling of the low-cost MTC device would be affected. That is, it would be very difficult for the low-cost MTC device to achieve any frequency selective gain. Hence, in the MTC standardization project, the 3GPP standardization organization needs to solve the problem of how to ensure the frequency selective gain for the low-cost MTC device.

For those MTC UEs that require coverage enhancement, it is challenging to design Physical Downlink Control Channel (PDCCH). Since PDCCH needs to account for normal operations of conventional UEs compliant with LTE Rel-8/9/10/11, scrambling sequences for PDCCH are associated with cell IDs and subframe numbers, and PDCCH regions vary dynamically from one subframe to another. With a certain level of coverage enhancement, if repeated PDCCH transmissions are desired, it is required to solve the problems of how to determine the PDCCH start frame number and the number of repetitions and how to avoid limitations on PCFICH/PHICH for combination of PDCCHs in multiple subframes.

Further, in the operation of an MTC UE with coverage enhancement, the PDSCH requires repeated transmissions of multiple subframes. There is a need for solution of the problem of how to signal the PDSCH start frame number and the number of PDSCH repetitions to the MTC UE. It is also required to redefine the timing relation between the PDCCH and the PDSCH.

SUMMARY

In order to solve the above problems, the present disclosure provides a mechanism for PDCCH transmission/reception and acquisition of PDSCH frequency selective gain for an MTC UE (including low-cost UE and other UEs running delay-tolerant MTC services and requiring a certain amount of network coverage enhancement) based on the LTE network. According to the present disclosure, a PDCCH start frame number, a start subframe and a number of repetitions based on the coverage enhancement level required by the MTC UE. Then, a DCI parameter for the MTC UE requiring the coverage enhancement can be configured. In the DCI, a timing relation between the PDCCH and the PDSCH can be added. For each low-cost MTC UE, DL data RB resources equal to or less than the maximum DL data RB resource that can be supported by the UE can be configured via RRC signaling for PDSCH/EPDCCH reception.

In an aspect of the present disclosure, a method performed by a base station is provided. The method comprises: obtaining a coverage enhancement level of a User Equipment (UE); determining Physical Downlink Control Channel (PDCCH) configuration information for the UE based on the coverage enhancement level of the UE; determining Physical Downlink Shared Channel (PDSCH) configuration information for the UE based on the coverage enhancement level of the UE; and modifying a Downlink Control Information (DCI) configuration parameter to add the PDCCH configuration information and the PDSCH configuration information.

In an embodiment, a PDCCH start frame number SFN, a start subframe i and a number N of repetitions for the UE are determined based on the coverage enhancement level of the UE.

In an embodiment, the PDCCH SFN and the number N of repetitions satisfy: SFN mod N=0, and PDCCH is transmitted repeatedly in N subframes starting from a subframe i within the SFN.

In an embodiment, a PDSCH start frame number and a number of repetitions for the UE are determined based on the coverage enhancement level of the UE.

In an embodiment, the step of determining the PDSCH configuration information for the UE comprises: transmitting to the UE a Channel Quality Indicator (CQI) measurement command; receiving a CQI measurement result from the UE; and determining a Physical Resource Block (PRB) to be used by the UE for receiving PDSCH based on the CQI measurement result.

In an embodiment, the number of PRBs to be used by the UE for receiving PDSCH is equal to or smaller than a maximum downlink data bandwidth the UE supports.

In an embodiment, the PDSCH start frame is fixed at the k-th subframe after its corresponding PDCCH and the number of PDSCH repetitions is associated with the coverage enhancement level of the UE, where k>=1.

In an embodiment, the UE comprises a Machine Type Communication (MTC) UE.

In an embodiment, the PDCCH configuration information and the PDSCH configuration information are configured via Radio Resource Control (RRC) signaling.

In an embodiment, a timing relation between PDCCH and PDSCH is changed to allow an earlier scheduling of PDSCH, i.e., the PDCCH carries scheduling information for PDSCH in a number of subsequent subframes.

In another aspect of the present disclosure, a method performed by a User Equipment (UE) is provided. The method comprises: receiving from a base station a Channel Quality Indicator (CQI) measurement command and performing a CQI measurement; reporting to the base station a specific number of best subband locations and CQI values associated with these subbands; and receiving Physical Downlink Control Channel (PDCCH) configuration information and Physical Downlink Shared Channel (PDSCH) configuration information transmitted from the base station. The PDCCH configuration information and the PDSCH configuration information are associated with a coverage enhancement level of the UE.

In an embodiment, the UE comprises a Machine Type Communication (MTC) UE.

In an embodiment, when the UE does not need any coverage enhancement, the UE reports to the base station a specific number of best subband locations and CQI values associated with these subbands periodically.

In a further aspect of the present disclosure, a base station is provided. The base station comprises: an obtaining unit configured to obtain a coverage enhancement level of a User Equipment (UE); a first determining unit configured to determine Physical Downlink Control Channel (PDCCH) configuration information for the UE based on the coverage enhancement level of the UE; a second determining unit configured to determine Physical Downlink Shared Channel (PDSCH) configuration information for the UE based on the coverage enhancement level of the UE; and a modifying unit configured to modify a Downlink Control Information (DCI) configuration parameter to add the PDCCH configuration information and the PDSCH configuration information.

In an embodiment, the first determining unit is configured to determine a PDCCH start frame number SFN and a number N of repetitions for the UE based on the coverage enhancement level of the UE.

In an embodiment, the PDCCH SFN and the number N of repetitions satisfy: SFN mod N=0, and PDCCH is transmitted repeatedly in subframes having same timeslot number in radio frames from SFN to SFN+N−1.

In an embodiment, the first determining unit is configured to determine a PDCCH start frame number SFN, a start subframe i and a number N of repetitions for the UE based on the coverage enhancement level of the UE.

In an embodiment, the PDCCH SFN and the number N of repetitions satisfy: SFN mod N=0, and PDCCH is transmitted repeatedly in N subframes starting from a subframe i within the SFN.

In an embodiment, the second determining unit is configured to determine a PDSCH start frame number and a number of repetitions for the UE based on the coverage enhancement level of the UE.

In an embodiment, the second determining unit is configured to: transmit to the UE a Channel Quality Indicator (CQI) measurement command; receive a CQI measurement result from the UE; and determine a Physical Resource Block (PRB) to be used by the UE for receiving PDSCH based on the CQI measurement result.

In an embodiment, the number of PRBs to be used by the UE for receiving PDSCH is equal to or smaller than a maximum downlink data bandwidth the UE supports.

In an embodiment, the second determining unit is configured to fix the PDSCH start frame at the k-th subframe after its corresponding PDCCH, and the number of PDSCH repetitions is associated with the coverage enhancement level of the UE.

In yet another aspect of the present disclosure, a User Equipment (UE) is provided. The UE comprises: a Channel Quality Indicator (CQI) unit configured to receive from a base station a CQI measurement command and perform a CQI measurement; a reporting unit configured to report to the base station a specific number of best subband locations and CQI values associated with these subbands; and a receiving unit configured to receive Physical Downlink Control Channel (PDCCH) configuration information and Physical Downlink Shared Channel (PDSCH) configuration information transmitted from the base station, the PDCCH configuration information and the PDSCH configuration information being associated with a coverage enhancement level of the UE.

In an embodiment, the UE comprises a Machine Type Communication (MTC) UE.

In an embodiment, the reporting unit is configured to report, when the UE does not need any coverage enhancement, to the base station a specific number of best subband locations and CQI values associated with these subbands periodically.

With the present disclosure, it is possible to increase resource utilization for LTE to support MTC UEs, improve frequency spectrum/energy efficiency, and reduce time/frequency resource conflicts between cells.

BRIEF DESCRIPTION OF THE DRAWINGS

The above and other objects, features and advantages will be more apparent from the following description of embodiments with reference to the figures, in which.

DETAILED DESCRIPTION

The embodiments of the present disclosure (in particular, a method for transmitting/receiving PDCCH, a base station and a UE for low cost UEs that may or may not require additional coverage enhancement or other UEs that support delay-tolerant MTC services and require a certain amount of coverage enhancement) will be detailed below with reference to the drawings. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE mobile communication system and its subsequent evolutions. Herein, it is to be noted that the present invention is not limited to the application exemplified in the embodiments. Rather, it is applicable to other communication systems, such as the future 5G cellular communication system.

Figure 1:
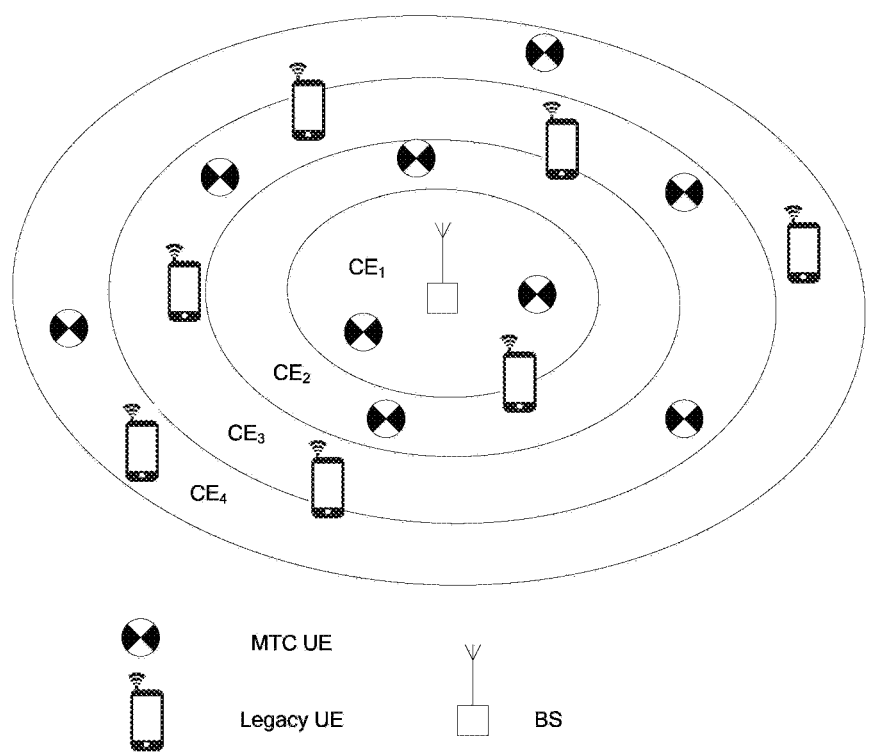
FIG. 1 is a schematic diagram showing a location distribution of MTC UEs in an LTE cell.

FIG. 1 shows a distribution of MTC UEs in an LTE cell. The cell is divided into M=4 coverage enhancement level regions, $CE_1$, $CE_4$. Accordingly, four groups of PRACH preamble sequences are required. Here, the MTC UEs at the edge of the cell experience the most significant channel fading (this region has the highest coverage enhancement level) and requires the highest amount of time-frequency resources for their UL/DL physical channels. In particular, the numbers of PDCCH/PDSCH/PUSCH repetitions are all associated with $CE_x$, where x=1, L and L is the number of coverage enhancement levels divided in the cell.

Figure 2:
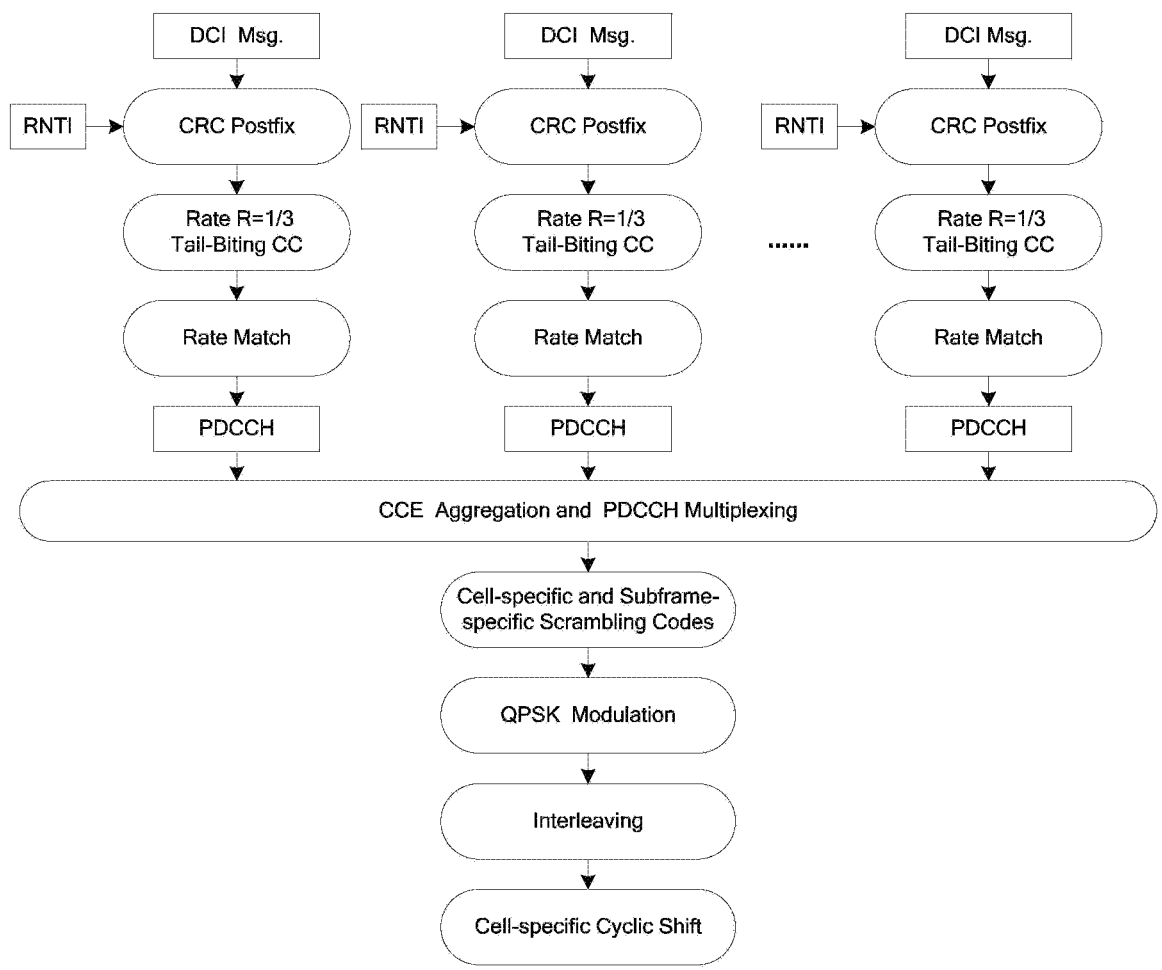
FIG. 2 is a schematic diagram showing a PDCCH process in an LTE network.

FIG. 2 shows a PDCCH process in an LTE network. Each DL subframe is divided into a control region and a data region. That is, the first portion of each subframe is used for transmitting PDCCH and occupies 1, 2 or 3 OFDM symbols (in the case where the system bandwidth of 1.4 MHz, the size of the PDCCH region is 2, 3 or 4 OFDM symbols). In the CA scenario, each carrier has its own PDCCH region. Additionally, the size of the PDCCH region varies dynamically on a per subframe basis so as to be adapted to instantaneous transmission traffic. For example, in one subframe, if less UEs are to be scheduled, there will be less control signaling required and thus a larger region of the subframe can be used for data transmission. In an LTE TDD system, the control region in each of Subframe 1 and Subframe 6 may occupy 2 OFDM symbols at most, since the third OFDM symbol is used for a primary sync signal. Similarly, for an MBSFN subframe, its PDCCH control region is limited to 2 OFDM symbols at maximum. A number of PDCCHs can be transmitted simultaneously in the DL control region of one subframe. The PDCCH is mainly used for carrying Downlink Control Information (DCI), e.g., a scheduling instruction and a power control command. As shown in FIG. 2, each DCI message has a postfix which is a 16-bit Cyclic Redundancy Check (CRC) code. A Radio Network Terminal Identifier (RNTI) is included in calculation of the CRC, i.e., the RNTI is transmitted implicitly. Different RNTIs can be transmitted depending on the purpose of the DCI message. For example, for a normal unicast data transmission, a terminal specific C-RNTI can be used. Once a terminal device has received a DCI, it first uses a specified RNTI for CRC verification. If the CRC has been verified, the DCI is received correctly. After the CRC postfix, the LTE system applies ⅓ rate tail-biting convolutional coding to transmission bits and applies a rate matching algorithm to adapt to the time-frequency resources for PDCCH transmission. After the rate matching, a cell-specific and subframe-specific scrambling sequence is applied to the coded bits to randomize inter-call interference and a Quadrature Phase Shift Keying (QPSK) modulation scheme is used. In order to achieve a simple and efficient control channel process, Resource Element (RE) mappings for a number of PDCCHs can adopt a particular structure based on Control. Channel Elements (CCEs). Here, each CCE includes 9 Resource Element Groups (REGs) and each REG includes 4 REs, i.e., each CCE consists of 36 REs. A particular PDCCH may consist of 1, 2, 4 or 8 CCEs, depending on the load and coding rate of the PDCCH for transmitting the DCI. The PDCCH for a UE experiencing severe channel fading can use multiple CCEs to compensate for disadvantage channel conditions. The number of CCEs included in one PDCCH is referred as an Aggregation Level (AL). Another factor to account for in CCE design relates to randomization of inter-cell interference and frequency diversity. The LTE adopts a cell-specific interleaving technique, which divides all the QPSK symbols in one CCE into a number of groups each including k symbols and then interleaves these QPSK symbols. Different cells use the same interleaver, with different shifts which are integer multiples of k. Finally, the CCEs are mapped onto REs first in the frequency domain and then in the time domain. The PDCCH uses a hierarchical indication method, which uses a Physical Control Format Indicator Channel (PCFICH) to indicate the size (number of OFDM symbols) of the PDCCH control region. All the UEs need to read the PCFICH before they can read the PDCCH successfully. For multi-antenna transmission, PDCCH and Physical Broadcast Channel (PBCH) use the same Antenna Port (AP) configuration.

Figure 3:
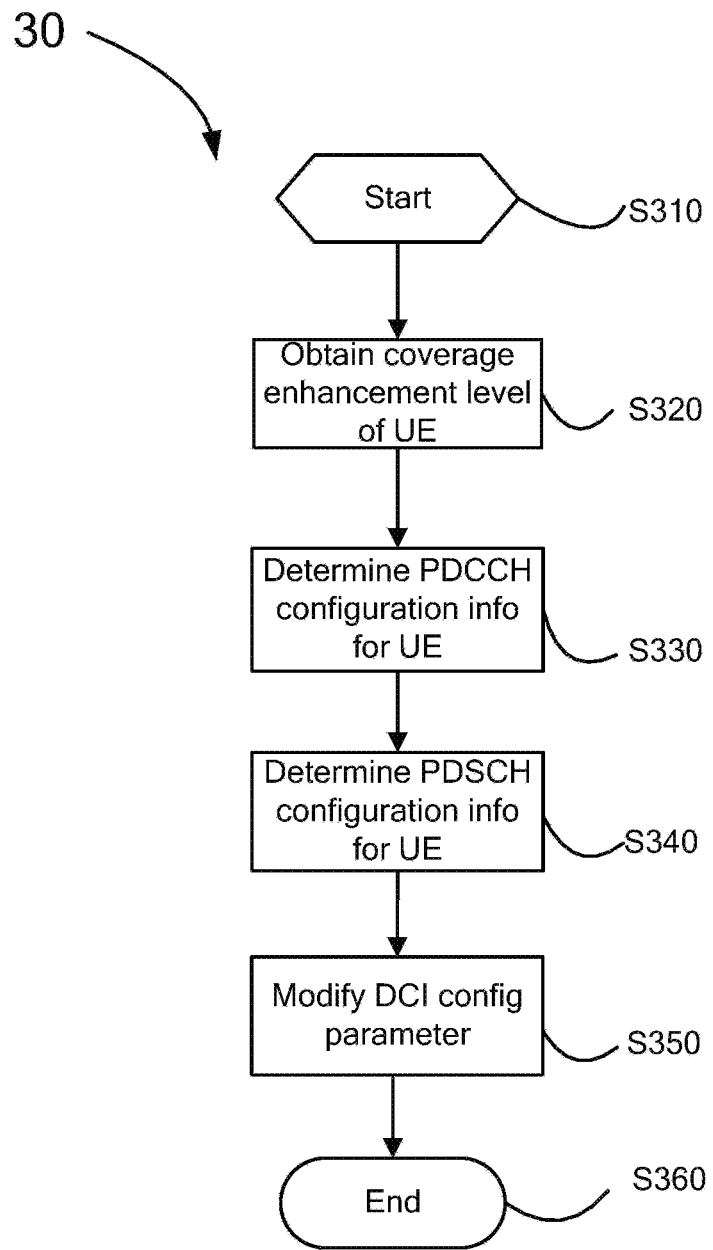
FIG. 3 is a flowchart illustrating a method performed by a base station according to an embodiment of the present disclosure.

FIG. 3 is a flowchart illustrating a method performed by a base station according to an embodiment of the present disclosure. As shown in FIG. 3, the method 30 starts with step S300.

At step S310, a coverage enhancement level of a UE is obtained.

At step S320, Physical Downlink Control Channel (PDCCH) configuration information for the UE is determined based on the coverage enhancement level of the UE. In the present disclosure, the PDCCH for an MTC UE having a coverage enhancement level of $CE_x$ can be transmitted within one subframe and the number of CCEs (i.e., AL) can be larger than 8 (e.g., 16, 32, etc.). These CCEs can be transmitted in one subframe and the transmission can be repeated in some subsequent subframes. The PDCCH for an MTC UE having a coverage enhancement level of $CE_x$ can be transmitted repeatedly in a plurality of subframes. Preferably, the PDCCH for the MTC UE can be transmitted repeatedly in subframes having different subframe numbers. Preferably, the PDCCH for the MTC UE can be transmitted repeatedly in subframes having the same subframe number (i.e., one subframe only in each radio frame).

Figure 4:
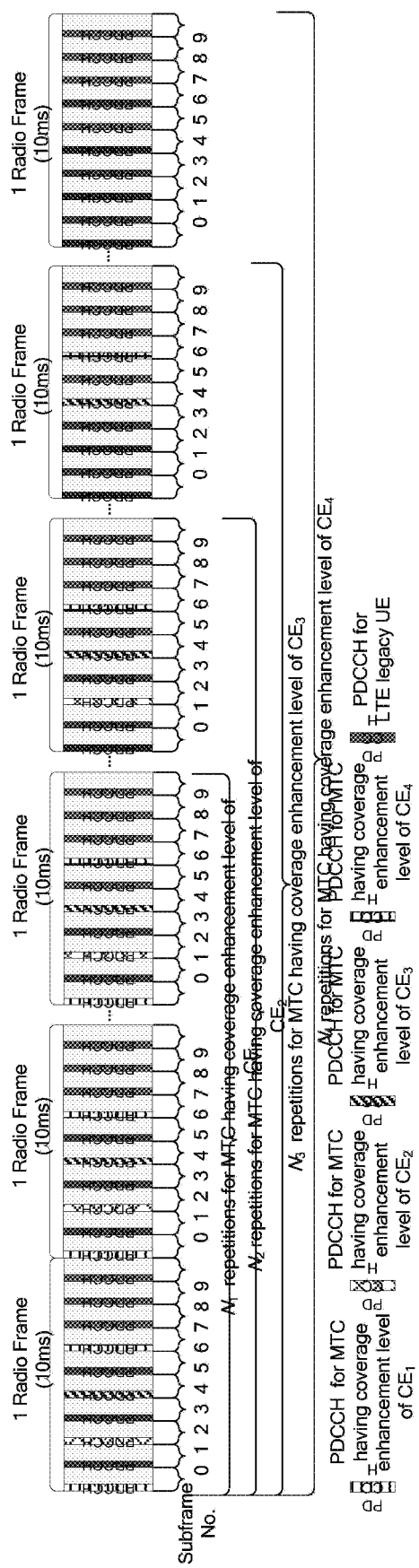
FIG. 4 is a schematic diagram showing a PDCCH configuration for an MTC UE with coverage enhancement according to an embodiment of the present disclosure.

As shown in FIG. 4, before an RRC connection is established, for an MTC UE having a coverage enhancement level of $CE_x$, if it needs to repeat the PDCCH for $N_x$ times, then preferably its starting frame number, SFN, satisfies SFN mod $N_x=0$. Let the subframe number be $slot_x$, preferably the PDCCH is transmitted repeatedly in $N_x$ subframes starting from $slot_x$. Preferably, the PDCCH can be transmitted repeatedly in subframse having the same timeslot number of $slot_x$ in frames SFN~SFN+$N_x$−1. Further, after the RRC connection has been established, the start frame number (including the start subframe number) and the number of repetitions of the PDCCH for the MTC UE requiring coverage enhancement can be configured via RRC signaling or in accordance with the predefined configuration before the RRC connection establishment.

Referring to FIG. 3 again, at step S330, Physical Downlink Shared Channel (PDSCH) configuration information for the UE is determined based on the coverage enhancement level of the UE. For example, the PDSCH start subframe can be fixed at the subframe following the last transmission of its corresponding PDCCH and the number of PDSCH repetitions is associated with the coverage enhancement level $CE_x$ of the UE.

At step S340, a Downlink Control Information (DCI) configuration parameter is modified to add the PDCCH configuration information and the PDSCH configuration information. For example, for an MTC UE having a coverage enhancement level of $CE_x$, the load on its DCI Format 1A can be simplified/reduced (e.g., its Modulation and Coding Scheme (MCS) can be fixed, its Transmission Mode (TM) can be fixed, its Hybrid Automatic Repeat reQuest (HARQ) process can be reduced and its Redundancy Version (RV) can be fixed, etc.) to reduce the number of CRC bits. Further, for the low-cost MTC UE, its maximum DL RB allocation can be limited to 6 RBs. A timing relation between the PDCCH and its corresponding PDSCH, e.g., the number of PDSCH repetitions and the PDSCH start subframe, or earlier scheduling information for the PDSCH, can be added in the DCI format for the MTC UE.

Figure 5:
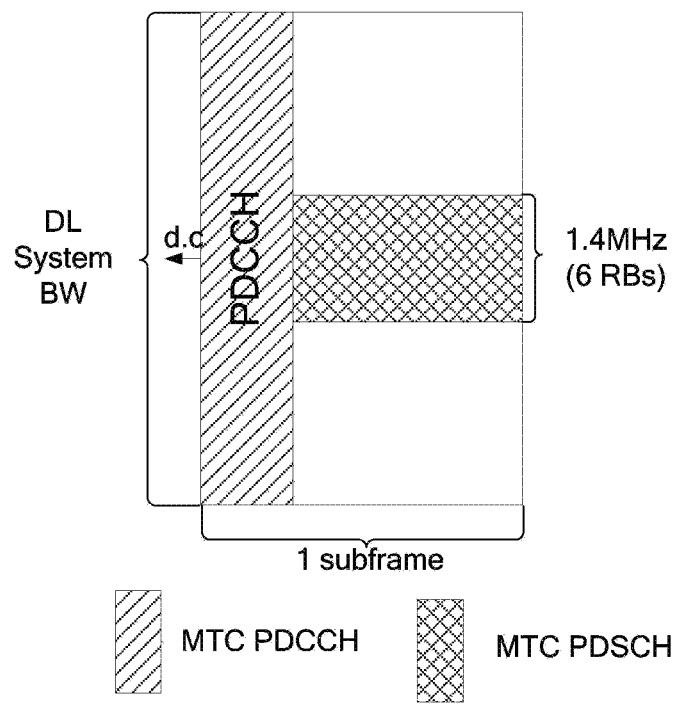
FIG. 5 is a schematic diagram showing a default DL subframe structure for a low-cost MTC UE according to an embodiment of the present disclosure.
Figure 6:
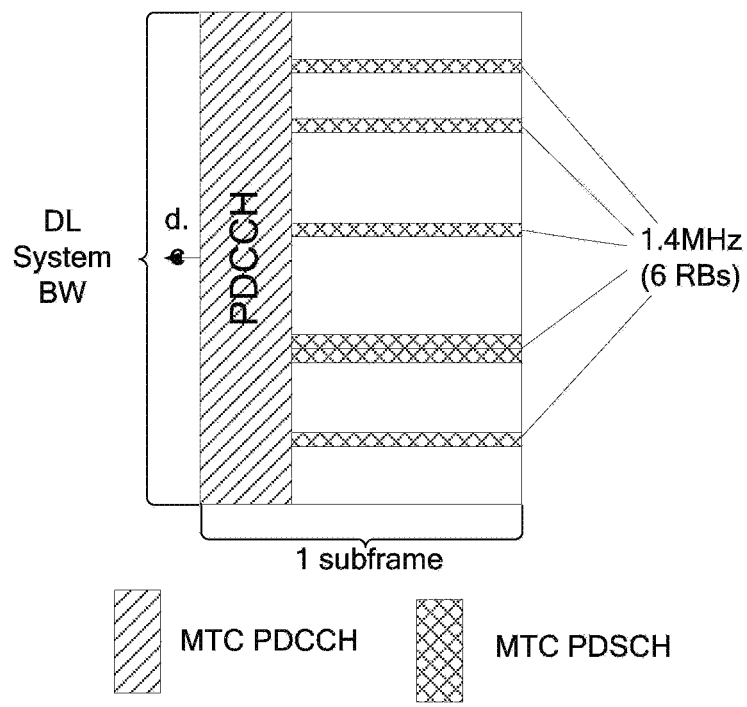
FIG. 6 is a schematic diagram showing a DL subframe structure for a low-cost MTC UE configured via RRC according to an embodiment of the present disclosure.

FIG. 5 and FIG. 6 each show a DL subframe structure for a low-cost MTC UE. In accordance with the agreements in the 60$^{th}$ meeting of 3GPP Working Group Radio Access Network (RAN), a low-cost MTC UE can read the control region over the entire carrier bandwidth, but can only read 1.4 MHz (i.e., 6 RBs) in the data channel. This is because the baseband frequency domain bandwidth is fixed at 1.4 MHz and the RF bandwidth is still the entire DL system bandwidth for the DL data channel; whereas, for the control channel, the baseband and RF bandwidths are still the entire system bandwidth. In this case, if the PDSCH is fixed at 6 RBs uniformly, the PDSCH frequency selective gain for the low-cost MTC UE will be limited. The UL for the low-cost MTC UE remains unchanged when compared to the UE in the current LTE system. The low-cost MTC UE uses one single receiving antenna and its maximum UL and DL transport blocks are limited to 1000 bits. Based on the above considerations, FIG. 5 shows a default configuration structure for the low-cost MTC UE, where the PDSCH is fixed at 6 RBs near the DC carrier. FIG. 6 shows a configuration structure for a low-cost MTC UE with frequency selective gain. In particular, the 6 RBs in FIG. 6 are RBs in which the low-cost MTC UE has high channel gain.

In the present disclosure, in order to ensure that the low-cost MTC UE can obtain the frequency selective gain, an eNB performs a dynamic scheduling (in this case, the timing relation between the PDCCH and the PDSCH needs to be changed, e.g., by scheduling the PDSCH a number of TTIs earlier) or the 6 RBs having the highest frequency selective gain can be configured via RRC signaling, preferably semi-statically. In particular, the RRC configuration process is described as follows.

First, the low-cost MTC UE receives a CQI measurement command transmitted from the eNB, initiates an aperiodic subband CQI feedback (with a transmission mode of TM1 and a CQI mode of 2-0), and feeds a CQI measurement result back to the eNB via PUSCH.

Then, the low-cost MTC UE measures PRB sets (each including n consecutive PRBs) based on a reference signal CRS for DL full-bandwidth control region, with the size of PRB set (i.e., the value of n) and the PRB sets on which the CQI measurement is to be performed being configured by the eNB semi-statically.

After the low-cost MTC UE has performed the CQI measurement on the respective CQI measurement subbands configured by the eNB, it only reports M subband locations having the best CQIs to the eNB and measures/reports a CQI value for these M subbands. Here the value of M can be configured by the eNB.

Next, in accordance with the CQI reported from the low-cost MTC UE, the eNB configures, via RRC signaling, m PRBs for the MTC UE to receive PDSCH/EPDCCH, where m<=6. The Information Element (IE) of the RRC signaling can be for example:

resourceBlockConfig-MTC-r12 ::= BIT STRING (SIZE(1 . . . 31))
resourceBlockConfig-MTC-r12 field descriptions
resourceBlockConfig
This value is indicated to a particular combination of the 6 PRBs for the MTC UE.
The size of resourceBlockConfig-MTC-r12 is derived from the value of dl-Bandwidth.

If the low-cost MTC UE does not need any coverage enhancement, the MTC UE reports CQI measurements for the m (m<=6) RBs configured via RRC and the eNB further schedules PDSCH/EPDCCH for the MTC UE. If the low-cost UE needs coverage enhancement, it does not need to report CQI periodically since such UE has very limited mobility and experience limited channel condition variation for a long time. Hence, the PRB information configured via RRC can be used.

Table 7.2.3.1 in 3GPP TS 36.213 can be modified within the CQI index table for low-cost MTC UEs. In this table, 3-bit CQIs are used and the CQI indices are selected as 1~8 and an entry of "No. of PDSCH Repetitions" (whose value may depend on actual situations) is added, as shown in the table below:

TABLE 1

| CQI Index | Modulation | Coding Rate × 1024 | Efficiency | No. of PDSCH Repetitions |
|---|---|---|---|---|
| 1 | QPSK | 78 | 0.1523 | XX |
| 2 | QPSK | 120 | 0.2344 | XX |
| 3 | QPSK | 193 | 0.3700 | XX |
| 4 | QPSK | 308 | 0.6016 | XX |
| 5 | QPSK | 449 | 0.8770 | XX |
| 6 | QPSK | 602 | 1.1758 | XX |
| 7 | 16QAM | 378 | 1.4766 | XX |
| 8 | 16QAM | 490 | 1.9141 | XX |

For a low-cost UE requiring coverage enhancement and another UE requiring coverage enhancement and running MTC services, before an RRC connection is established (e.g., during a random access procedure), the PDCCH configuration (including the start frame and the number of repetitions, as shown in FIG. 4) can be predefined based on the required coverage enhancement level. The PDSCH configuration information is included in the DCI. During this phase, the PDSCH is transmitted in 6 RBs near the DL DC carrier.

After the RRC connection has been established, for a low-cost UE requiring coverage enhancement and another UE requiring coverage enhancement and running MTC services, the eNB triggers the low-cost MTC UE to measure/report CQI (the CQI is measured based on the CRS reference signal in the control region). Then, the eNB can configure up to 6 RBs for each MTC UE via RRC signaling for receiving PDSCH. In this case, the PDSCH start frame and the number of PDSCH repetitions can be modified within the DCI. In this case, the PDCCH configuration (including PDCCH start frame and the number of PDCCH repetitions) can be re-configured or the configuration predefined by the system can be used.

Finally, the method 30 ends at step S350.

Figure 7:
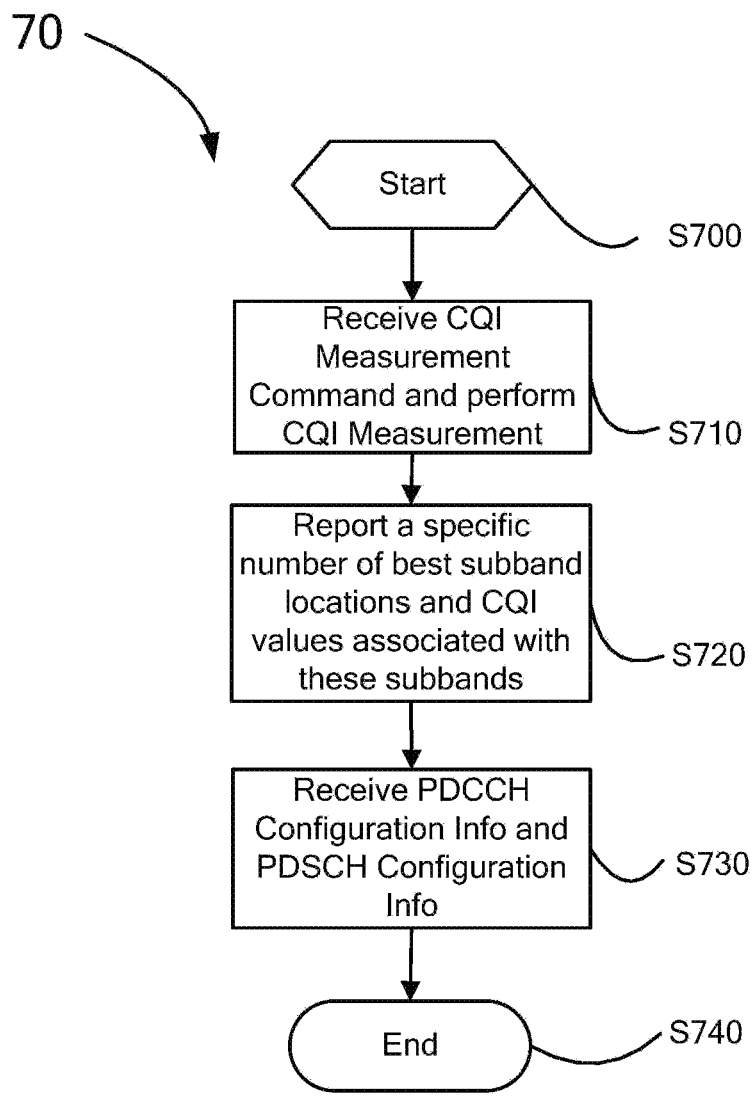
FIG. 7 is a flowchart illustrating a method performed by a UE according to an embodiment of the present disclosure.

FIG. 7 is a flowchart illustrating a method performed by a UE according to an embodiment of the present disclosure. As shown in FIG. 7, the method 70 starts with step S700.

At step S710, a Channel Quality Indicator (CQI) measurement command is received from a base station and a CQI measurement is performed.

At step S720, a specific number of best subband locations and CQI values associated with these subbands are reported to the base station. If the UE does not need any coverage enhancement, the UE reports to the base station a specific number of best subband locations and CQI values associated with these subbands periodically. If the low-cost UE needs coverage enhancement, it does not need to report CQI periodically since such UE has very limited mobility and experience limited channel condition variation for a long time. Hence, the PRB information configured via RRC can be used.

At step S730, Physical Downlink Control Channel (PDCCH) configuration information and Physical Downlink Shared Channel (PDSCH) configuration information transmitted from the base station are received. The PDCCH configuration information and the PDSCH configuration information are associated with a coverage enhancement level of the UE.

Finally, the method 70 ends at step S740.

Figure 8:
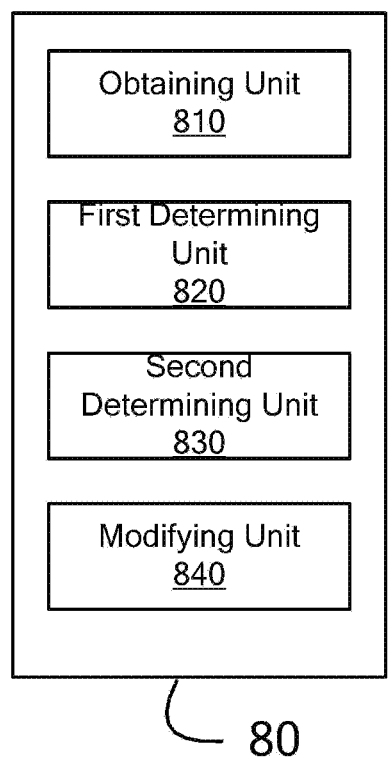
FIG. 8 is a block diagram of a base station according to an embodiment of the present disclosure.

FIG. 8 shows a block diagram of a base station according to an embodiment of the present disclosure. As shown in FIG. 8, the base station 80 includes an obtaining unit 810, a first determining unit 820, a second determining unit 830 and a modifying unit 840.

The obtaining unit 810 is configured to obtain a coverage enhancement level of a User Equipment (UE).

The first determining unit 820 is configured to determine Physical Downlink Control Channel (PDCCH) configuration information for the UE based on the coverage enhancement level of the UE. For example, the first determining unit 820 can be configured to determine a PDCCH start frame number SFN and a number N of repetitions for the UE based on the coverage enhancement level of the UE. Preferably, the PDCCH SFN and the number N of repetitions satisfy: SFN mod N=0, and PDCCH is transmitted repeatedly in subframes having same timeslot number in radio frames from SFN to SFN+N−1.

The second determining unit 830 is configured to determine Physical Downlink Shared Channel (PDSCH) configuration information for the UE based on the coverage enhancement level of the UE. For example, the second determining unit can be configured to determine a PDSCH start frame number and a number of repetitions for the UE based on the coverage enhancement level of the UE.

Preferably, the second determining unit can be configured to: transmit to the UE a Channel Quality Indicator (CQI) measurement command; receive a CQI measurement result from the UE; and determine a Physical Resource Block (PRB) to be used by the UE for receiving PDSCH based on the CQI measurement result.

The modifying unit 840 is configured to modify a Downlink Control Information (DCI) configuration parameter to add the PDCCH configuration information and the PDSCH configuration information.

Figure 9:
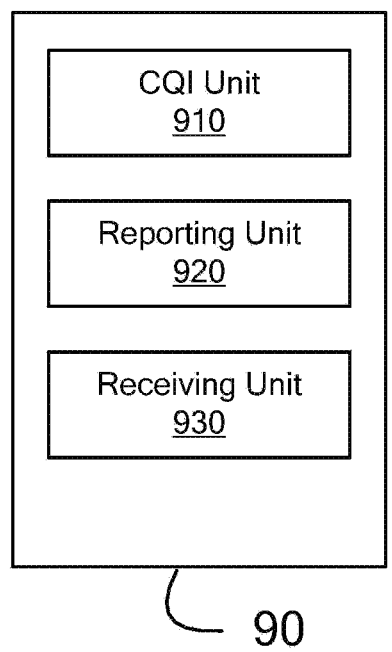
FIG. 9 is a block diagram of a UE according to an embodiment of the present disclosure.

FIG. 9 shows a block diagram of a UE according to an embodiment of the present disclosure. As shown in FIG. 9, the UE 90 includes a Channel Quality Indicator (CQI) unit 910, a reporting unit 920 and a receiving unit 930.

The CQI unit 910 is configured to receive from a base station a CQI measurement command and perform a CQI measurement.

The reporting unit 920 is configured to report to the base station a specific number of best subband locations and CQI values associated with these subbands. Further, the reporting unit 920 can be configured to report, when the UE does not need any coverage enhancement, to the base station a specific number of best subband locations and CQI values associated with these subbands periodically. If the UE needs coverage enhancement, it does not need to report CQI periodically since such UE has very limited mobility and experience limited channel condition variation for a long time. Hence, the PRB information configured via RRC can be used.

The receiving unit 930 is configured to receive Physical Downlink Control Channel (PDCCH) configuration information and Physical Downlink Shared Channel (PDSCH) configuration information transmitted from the base station. The PDCCH configuration information and the PDSCH configuration information are associated with a coverage enhancement level of the UE.

With the mechanisms for transmitting and receiving PDCCH process information for an MTC UE in a serving cell according to the present disclosure, it is possible to allow a base station to transmit PDCCH information for the serving cell and allow a low-cost MTC UE to obtain a frequency selective gain, and to achieve PDCCH/PDSCH enhancement in MTC applications with coverage enhancement. With the present disclosure, it is possible to increase resource utilization for LTE to support MTC UEs, improve frequency spectrum/energy efficiency, and reduce time/frequency resource conflicts between cells.

It can be appreciated that the above embodiments of the present disclosure can be implemented in software, hardware or any combination thereof. For example, the internal components of the base station and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and the like.

In the present disclosure, the term "base station" means a mobile communication data and control exchange center with a large transmit power and a wide coverage area and including functions such as resource allocation/scheduling, data reception/transmission and the like. The term "user equipment" means a user mobile terminal, including e.g., a mobile phone, a notebook computer and other terminal devices that can wirelessly communicate with a base station or and micro base station.

Further, the embodiments of the present disclosure can be implemented in computer program products. More specifically, a computer program product can be a product having a computer readable medium with computer program logics coded thereon. When executed on a computing device, the computer program logics provide operations for implementing the above solutions according to the present disclosure. When executed on at least one processor in a computing system, the computer program logics cause the processor to perform the operations (methods) according to the embodiments of the present disclosure. This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the solutions according to the embodiments of the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A base station apparatus comprising:
   determination circuitry configured to determine a repetition number of a Physical Downlink Control CHannel (PDCCH) for a specific user equipment, and to determine a repetition number of a Physical Downlink Shared CHannel (PDSCH) for the specific user equipment, the repetition number of the PDCCH corresponding to the number of transmission repetitions of the PDCCH to the specific user equipment, and the repetition number of the PDSCH corresponding to the number of transmission repetitions of the PDSCH to the specific user equipment; and
   transmission circuitry configured to transmit the PDCCH for the specific user equipment based on the repetition number of the PDCCH, and to transmit the PDSCH for the specific user equipment based on the repetition number of the PDSCH, the PDCCH including Downlink Control Information (DCI), the DCI including information indicating the repetition number of the PDCCH and information indicating the repetition number of the PDSCH, wherein
      the transmission circuitry is further configured to transmit information indicating the repetition number of the PDCCH for the specific user equipment through RRC (Radio Resource Control), whereby the repetition number of the PDCCH for the specific user equipment is configured by the RRC, and re-configured by the DCI.

2. The base station apparatus according to claim 1, wherein
   the transmission circuitry is further configured to transmit information indicating the repetition number of the PDSCH for the specific user equipment through RRC (Radio Resource Control), the repetition number of the PDSCH for the specific user equipment being configured by the RRC, and modified by the DCI.

3. A user equipment comprising:
   reception circuitry configured to receive a Physical Downlink Control CHannel (PDCCH) specifically for the user equipment, the PDCCH including Downlink Control Information (DCI), the DCI including information indicating a repetition number of the PDCCH specifically for the user equipment and information indicating a repetition number of a Physical Downlink Shared CHannel (PDSCH) specifically for the user equipment, the repetition number of the PDCCH corresponding to the number of transmission repetitions of the PDCCH, and the repetition number of the PDSCH corresponding to the number of transmission repetitions of the PDSCH; and
   determination circuitry configured to determine the repetition number of the PDCCH based on the DCI, and to determine the repetition number of the PDSCH based on the DCI, wherein
      the reception circuitry is configured to receive the PDCCH transmitted for the user equipment based on the repetition number of the PDCCH, and to receive the PDSCH transmitted for the user equipment based on the repetition number of the PDSCH,
      the reception circuitry is further configured to receive information indicating the repetition number of the PDCCH for the user equipment through RRC (Radio Resource Control), and
      the determination circuitry is further configured to determine the repetition number of the PDCCH based on the RRC, and to re-determine the repetition number of the PDCCH based on the DCI.

4. The user equipment according to claim 3, wherein
the reception circuitry is further configured to receive information indicating the repetition number of the PDSCH for the user equipment through RRC (Radio Resource Control), and
the determination circuitry is further configured to determine the repetition number of the PDSCH based on the RRC, and to re-determine the repetition number of the PDSCH based on the DCI.

5. A communication method of a base station apparatus, comprising:

determining a repetition number of a Physical Downlink Control CHannel (PDCCH) for a specific user equipment, the repetition number of the PDCCH corresponding to a number of transmission repetitions of the PDCCH;

determining a repetition number of a Physical Downlink Shared CHannel (PDSCH) for the specific user equipment, the repetition number of the PDSCH corresponding to a number of transmission repetitions of the PDSCH;

transmitting the PDCCH for the specific user equipment based on the repetition number of the PDCCH, the PDCCH including Downlink Control Information (DCI), the DCI including information indicating the repetition number of the PDCCH and information indicating the repetition number of the PDSCH;

transmitting the PDSCH for the specific user equipment based on the repetition number of the PDSCH, and transmitting information indicating the repetition number of the PDCCH for the specific user equipment through RRC (Radio Resource Control), the repetition number of the PDCCH for the specific user equipment being configured by the RRC, and re-configured by the DCI.

6. The communication method according to claim 5, further comprising:

transmitting information indicating the repetition number of the PDSCH for the specific user equipment through RRC (Radio Resource Control), the repetition number of the PDSCH for the specific user equipment being configured by the RRC, and modified by the DCI.

7. A communication method of a user equipment, comprising:

receiving a Physical Downlink Control CHannel (PDCCH) specifically for the user equipment, the PDCCH including Downlink Control Information (DCI), the DCI including information indicating a repetition number of the PDCCH specifically for the user equipment and information indicating a repetition number of a Physical Downlink Shared CHannel (PDSCH) specifically for the user equipment, the repetition number of the PDCCH corresponding to the number of transmission repetitions of the PDCCH, and the repetition number of the PDSCH corresponding to the number of transmission repetitions of the PDSCH;

determining the repetition number of the PDCCH based on the DCI;

determining the repetition number of the PDSCH based on the DCI; and receiving information indicating the repetition number of the PDCCH for the user equipment through RRC (Radio Resource Control), wherein the receiving step receives the PDCCH transmitted specifically for the user equipment based on the repetition number of the PDCCH, and receives the PDSCH transmitted specifically for the user equipment based on the repetition number of the PDSCH, and the repetition number of the PDCCH is determined based on the RRC and re-determined based on the DCI.

8. The communication method according to claim 7, further comprising:

receiving information indicating the repetition number of the PDSCH for the user equipment through RRC (Radio Resource Control), wherein the repetition number of the PDSCH is determined based on the RRC and re-determined based on the DCI.

* * * * *